(12) United States Patent
Gadot et al.

(10) Patent No.: US 10,008,085 B1
(45) Date of Patent: Jun. 26, 2018

(54) MOBILE DEVICE FOR MONITORING USER'S PREMISES

(71) Applicant: INUITIVE LTD., Ra'anana (IL)

(72) Inventors: Shlomo Gadot, Herzliya (IL); Dor Zepeniuk, Kfar Hess (IL)

(73) Assignee: INUITIVE LTD., Ra'anana (IL)

( * ) Notice: Subject to any disclaimer, the term of this patent is extended or adjusted under 35 U.S.C. 154(b) by 0 days. days.

(21) Appl. No.: 15/391,296

(22) Filed: Dec. 27, 2016

(51) Int. Cl.
*G08B 1/08* (2006.01)
*G08B 19/00* (2006.01)
*G05D 1/00* (2006.01)
*G08B 25/10* (2006.01)
*H02J 7/00* (2006.01)

(52) U.S. Cl.
CPC ........... *G08B 19/00* (2013.01); *G05D 1/0088* (2013.01); *G08B 25/10* (2013.01); *H02J 7/0042* (2013.01)

(58) Field of Classification Search
CPC ...... G08B 19/00; G08B 25/10; G05D 1/0088; H02J 7/0042

USPC ............ 340/539.22, 2, 3, 23; 701/501, 506, 701/573.4
See application file for complete search history.

(56) References Cited

U.S. PATENT DOCUMENTS

| | | | |
|---|---|---|---|
| 9,604,723 B2 * | 3/2017 | Liu | B64C 39/024 |
| 9,678,507 B1 * | 6/2017 | Douglas | G08G 5/003 |
| 9,684,834 B1 * | 6/2017 | Ludwig | G06K 9/00677 |
| 2016/0340006 A1 * | 11/2016 | Tang | B63C 9/01 |
| 2017/0053169 A1 * | 2/2017 | Cuban | H04N 7/185 |
| 2017/0185849 A1 * | 6/2017 | High | G06K 9/00771 |
| 2017/0187993 A1 * | 6/2017 | Martch | B64C 39/024 |
| 2017/0193781 A1 * | 7/2017 | Bryson | G08B 13/2491 |

\* cited by examiner

*Primary Examiner* — Dhaval Patel
(74) *Attorney, Agent, or Firm* — Browdy and Neimark, PLLC

(57) ABSTRACT

A monitoring system is provided for monitoring a user's premises. The system comprises a monitoring device that comprises at least one sensor configured to enable determining occurrence of one or more pre-defined events, wherein the monitoring device is characterized in that it is configured to automatically guide itself to move within the user's premises, and in addition the system comprises a docking station for the monitoring device.

17 Claims, 4 Drawing Sheets

MOBILE DEVICE FOR MONITORING USER'S PREMISES

TECHNICAL FIELD

The present disclosure relates to the field of consumer electronics, and in particular to devices that enable monitoring user's premises.

BACKGROUND

Various alarm systems are becoming increasingly popular in residential areas. The most common forms of sensors in residential areas and homes are fire and smoke detectors and intrusion or burglar alarms. In addition there is an increasing use of devices which monitor the status of various appliances in the home, such as a gas-fired water heater, gas-fired furnace, freezers and the like. Similar alarm systems are used in industry. As the systems are expanded at each location, it becomes more and more important to have the ability to manage these sensors, preferably in a centralized way so that a single monitoring device may determine the status of all of the sensors to establish whether they are operative at all times and to establish when an alarm is sounded, the type of the alarm and its whereabouts.

This has resulted in the demand for a central monitor which can communicate with all forms of sensors in a home or industrial installation. To accomplish this objective, transmitters have been devised for coupling with the various sensors and transmitting information to a receiver of a central monitor system. The information transmitted may identify the type of alarm and its location. In industrial applications, radio transmitters are not frequently used, because it is easy to install wiring to hook up the various sensors directly with the central monitor system. However in the home, wiring is unattractive and with the use of radio receivers and transmitters, the wiring is eliminated.

However, since a vast number of sensors are used for a variety of applications, such as fire/smoke detectors, burglar alarm systems, temperature sensors and others, this large number of sensors presents several challenges, among which:

Management—to be able to retrieve and process all readings obtained from the various sensors;

Installation and power—to be able to overcome the problems associated with the wiring required for the sensors' assemblies, or alternatively be able to overcome the problems associated with rather complex wireless systems. In addition, if wireless systems are implemented, the sensors are associated with transmitters that normally have their own power supply which is separate from the sensor. Typically, it involves locating the transmitter outside of the sensor, adding to the bulkiness of the overall system and detracting from the attractiveness of various sensors which are visible, such as the smoke and the intrusion detectors;

Cost—the system price increases rather rapidly with the increasing number of the sensors used, and the associated requirement to be able to communicate with this increasing number of sensors.

Typically, in most of the alarm systems used nowadays, sensors are installed at specific points in the premises and are capable to forward data to a central point, where the data received is processed. Today's a typical alarm system topology is a star topology (although mesh topology is also known) whether wired or wireless, and wherein the latter type of systems (wireless) are also known to be implemented in a mesh topology.

Still, the novel monitoring/alarm systems proposed by the present invention, overcomes the above and other drawbacks of prior art systems.

SUMMARY OF THE DISCLOSURE

The disclosure may be summarized by referring to the appended claims.

It is an object of the present invention to provide a very flexible monitoring and/or alarm system to accommodate various requirements for different users' premises.

It is another object of the present invention to provide a system that is able to efficiently monitor users' premises while using a minimal number of sensors.

Other objects of the present invention will become apparent from the following description.

According to a first embodiment of the present disclosure, there is provided a mobile monitoring device for monitoring (e.g. observing, sensing, scanning and the like) a user's premises, wherein the monitoring device comprises at least one sensor configured to enable determining occurrence of one or more pre-defined events.

In accordance with another embodiment, the monitoring device is characterized in that it is configured to autonomously guide itself to move within the user's premises.

According to another embodiment, the monitoring device comprises plurality of sensors and wherein each of at least two of the plurality of sensors, is configured to enable determining occurrence of at least one pre-defined event different from the other.

In accordance with another embodiment, the at least one sensor is a member selected from a group that consists of: a motion sensor, a smoke detector, a temperature sensor, a depth sensor, an image sensor, a pyro-electric sensor, and any combination thereof.

By yet another embodiment, the monitoring device is configured to automatically and/or autonomously guide itself to move on the floor within the user's premises.

According to still another embodiment, the monitoring device is configured to automatically and/or autonomously guide itself to move within the space of the user's premises.

According to another embodiment, the monitoring device is further configured to affect activities of other electronic devices located within the user's premises. Few such examples are: serving as a navigational tool for guiding automatic vacuum cleaners, personal robots and the like which move around the user's premises, a tool for interfacing with appliances that move around the user's premises (e.g. personal robots), acting as a depth sensing unit of home infotainment systems (e.g. control and gaming).

In accordance with another embodiment, the monitoring device comprises:

a main body, provided with moving means driven by a drive motor (i.e. a mobile structure, e.g. a drone or an autonomous miniature vehicle, and the like);

at least one sensor configured to enable determining occurrence of one or more pre-defined event, attached to the main body; and a power module for supplying electric power to the drive motor and to said at least one sensor.

By still another embodiment, the monitoring device further comprises:

at least one processor configured to receive data acquired by the at least one sensor.

By still another embodiment, the monitoring device further comprising a transmitter, configured to forward information based on data acquired by the at least one sensor. The data can be for example raw data as received from the at least one sensor, or processed data in case the monitoring device comprises a processor operative to process data received from the at least one processor, or a combination thereof. The transmitter preferably allows the monitoring device to forward information and telemetry to any one or more of the members the belong to the group that consists of the monitoring device host, the monitoring device base, the monitoring device docking station, a Wi-Fi router, and the like, either by wire or wirelessly or a combination thereof.

In accordance with another embodiment, the monitoring device further comprising an indicator for displaying at least one of below:
1) status of the power module; and
2) operating status of the at least one sensor.

According to another embodiment, the monitoring device further comprises a direction sensor (e.g. an orientation sensor) for detecting a moving direction of said main body. For example, an IMU ("Inertial Motion Unit") such as a 1X-9X motion sensor may be used as the direction sensor.

Optionally, the monitoring device further comprises a controller configured for controlling the moving means according to an output of the direction sensor. Preferably, the direction sensor is mounted on a forward section of the main body of the monitoring device.

By yet another embodiment, the monitoring device is configured to operate periodically (e.g. carrying out periodic patrols) by moving along a pre-defined path within the user's premises. As described in some of the above embodiments, the monitoring device is characterized in that it is configured to autonomously guide itself to move within the user's premises. Thus, according to the present embodiment, though the path along which the monitoring devices is configured to operate is pre-defined, still, the device has autonomous navigation capabilities, allowing it to adapt itself to changes (e.g. obstacles) in its pre-defined path (e.g. new furniture, pets, people, and the like)

In the alternative, the monitoring device is configured to move along a path determined based on data retrieved from the at least one sensor. For example, if data retrieved from one of the sensors comprised in the monitoring device indicates that an event is likely to occur or is currently occurring, the monitoring device may be directed to that area.

In accordance with another aspect of the invention, there is provided a system comprising the monitoring device described hereinabove and a docking station, wherein the docking station is configured to enable charging the monitoring device (e.g. the power module of the monitoring device) with electric energy.

In another embodiment, the system comprises a charger that is configured to charge wirelessly the monitoring device.

According to another embodiment of this aspect, the docking station comprises a receiver configured to receive data retrieved from the at least one sensor of the monitoring device.

By yet another embodiment, the docking station comprises a transmitter configured to transmit radio signals, and wherein the monitoring devices comprises a receiver configured to receive radio signals transmitted by the docking station.

In other words, according to certain embodiments of the invention, the docking station and the monitoring device are configured to exchange wireless communications therebetween.

Optionally or in the alternative, the monitoring devices is configured to download information to the docking station using wired connection, while the monitoring device is physically associated with (e.g. while parking at) the docking station. In accordance with still another embodiment, the receiver of the monitoring device is configured to utilize information retrieved from the radio signals transmitted from the docking station, in order to allow the monitoring device to reach the docking station. In other words, radio signals transmitted by the docking station, are used according to this embodiment by the monitoring device to home on the docking station in order to return to its docking place thereat.

According to another embodiment, the system further comprises at least one processor (which may be installed at the monitoring device or at the docking station or at both) for processing data retrieved from the at least one sensor, and determining therefrom whether one or more pre-defined events had occurred. For example, based on data retrieved from a motion sensor to determine whether there is a burglar moving around the user's premises.

In accordance with another embodiment, the processor is configured to receive data from two or more different sensors and to determine occurrence of a pre-defined event based on data retrieved from the two or more sensors. For example, based on data retrieved from both a motion sensor and a depth sensor, to determine whether there is a burglar moving around the user's premises.

BRIEF DESCRIPTION OF THE DRAWINGS

For a more complete understanding of the present invention, reference is now made to the following detailed description taken in conjunction with the accompanying drawings wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

Figure 1:
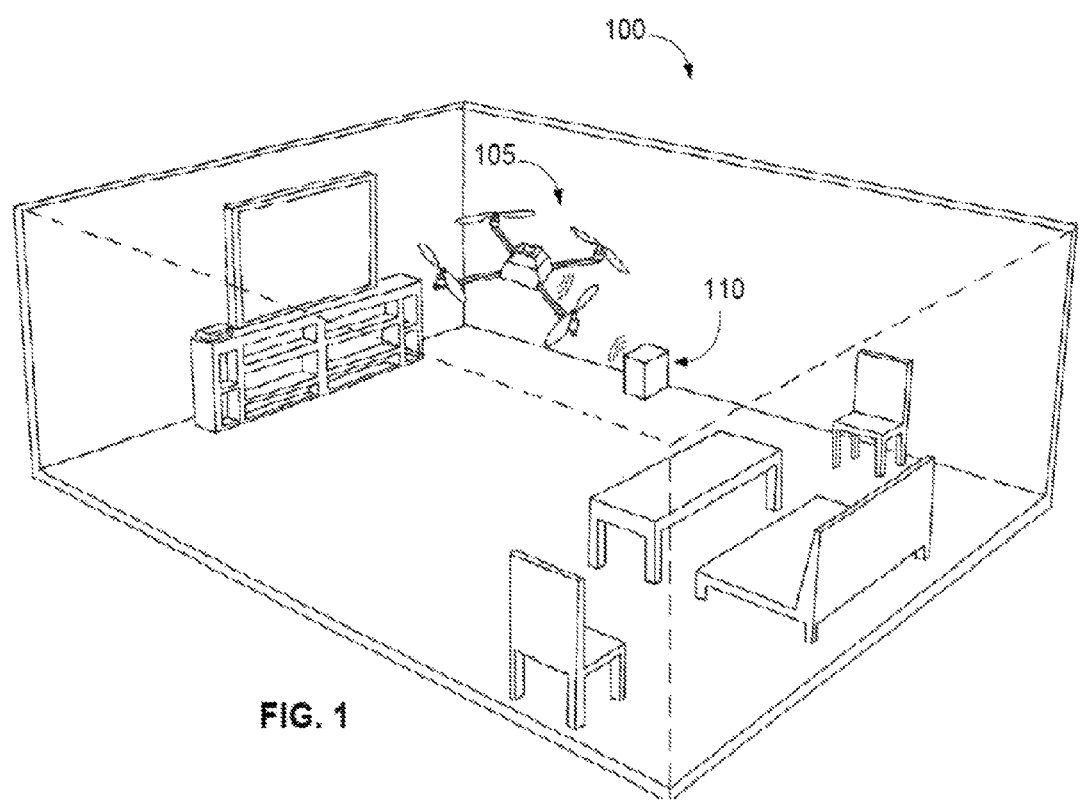
FIG. 1—is a schematic illustration of an example of a system implementing an embodiment of the present invention.

In the following description, for the purposes of explanation, numerous specific details are set forth in order to provide a better understanding of the present invention by way of examples. It should be apparent, however, that the present invention may be practiced without these specific details.

drawings wherein:

FIG. 1 illustrates an exemplified block diagram presenting a system 100 implementing an embodiment of the present invention. The system of this example comprises two main components, namely, a mobile monitoring device 105 and a docking station 110 for docking monitoring device 105 thereat.

Figure 2:
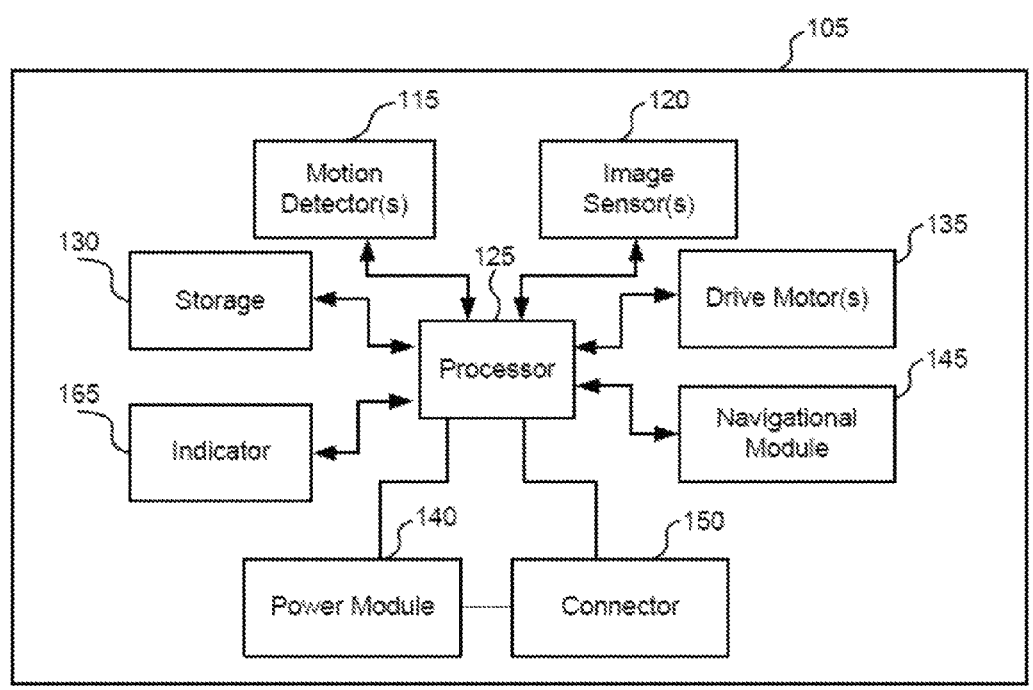
FIG. 2—is a block diagram of components comprised in a monitoring device of the system of FIG. 1.

FIG. 2 is a schematic block diagram of components comprised in the monitoring device 105 of this example which is a platform in a form of a drone, adapted to carry the following sensors: a motion detector (sensor) 115 and an image sensor 120. In addition, a depth detector (sensor) (not shown) may also be included.

The term "image sensor" (or "imaging sensor") as used herein throughout the specification and claims, is used to denote a sensor that detects and conveys information that constitutes an image. This may be achieved by converting the variable attenuation of waves (as they pass through or reflected off objects) into signals. Image sensors are used in electronic imaging devices of both analog and digital types, among which are digital cameras, camera modules, night vision such as thermal imaging devices, sonar and others. Typically, the currently used types of sensors are semiconductor charge-coupled devices (CCD) or active pixel sensors in complementary metal-oxide-semiconductor (CMOS) or N-type metal-oxide-semiconductor (NMOS, Live MOS) technologies.

In addition, the monitoring device of this example further includes a processor 125 and a storage 130 associated therewith. The processor is configured to receive information captured by the various sensors that are mounted on the platform, and either process the received information (or have it partially processed), or forward this information towards another device (e.g. towards docking station 110 of FIG. 1).

Figure 3:
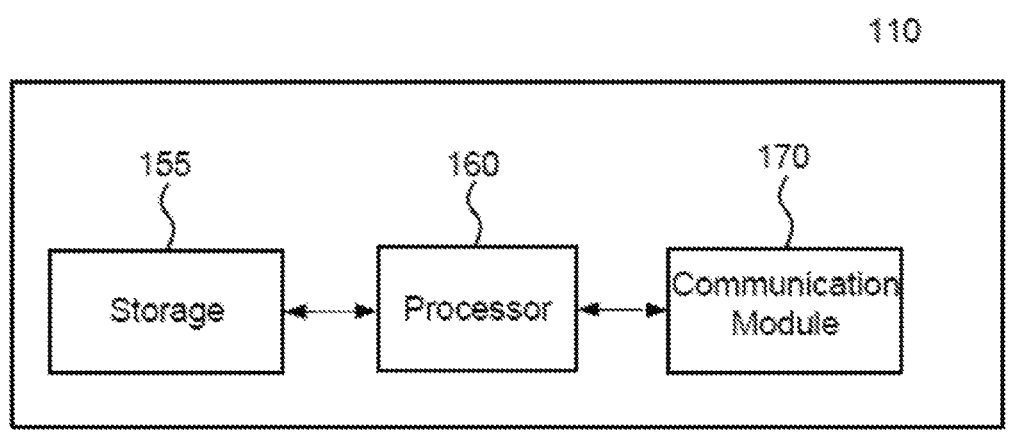
FIG. 3—is a block diagram of components comprised in a docking station of the system of FIG. 1.

Furthermore, monitoring device 105 comprises a drive motor 135 (e.g. one that provides 3 dimensional moving ability to the drone, or in the alternative a number of drive motors, to provide the required multi-dimensional moving ability), allowing the drone to move within the user's premises space, a power module 140 (e.g. comprising a rechargeable battery) for supplying electric power to the drive motor and to the sensors that are mounted on the drone, a navigational module 145 which includes a controller, for allowing the drone to fly as per the system requirements, and a connector 150 which is configured to allow the drone to connect to the docking station with the aid of the drone's drive motor at times when the drone (and the sensors mounted thereon) are not operative to survey and monitor the user's premises. While being connected to the docking station 110 (which is illustrated in a block diagram presented in FIG. 3), the rechargeable battery comprised in power module 140 is recharged, and data that was stored at storage means 130 while the drone was flying and the sensors were operative, may be downloaded to the docking station, e.g. to storage 155 comprised in the docking station, and/or for a further processing by a processor 160 comprised in the docking station. Optionally, docking station 110 may further comprise a communication module 170 (for example, a modem, Ethernet card, or any other interface) configured to exchange data with a communications network and/or drone 105.

Monitoring device 105 may further include an indicator 165 for indicating the status of the power module 140, e.g. that power module 140 is not currently being recharged and/or that energy currently stored in power module 140 is under a pre-defined low level. Indicator 165 (or another indicator, as the case may be), is used to indicate also the operating status of the sensors (e.g. when there is a malfunction in one of the sensors). These indications may be for example visual indications (e.g. blinking light), audio indications (a certain alarming sound), by sending a message to a pre-defined address (e.g. the user's mobile phone), or by implementing any other applicable form.

Figure 4:
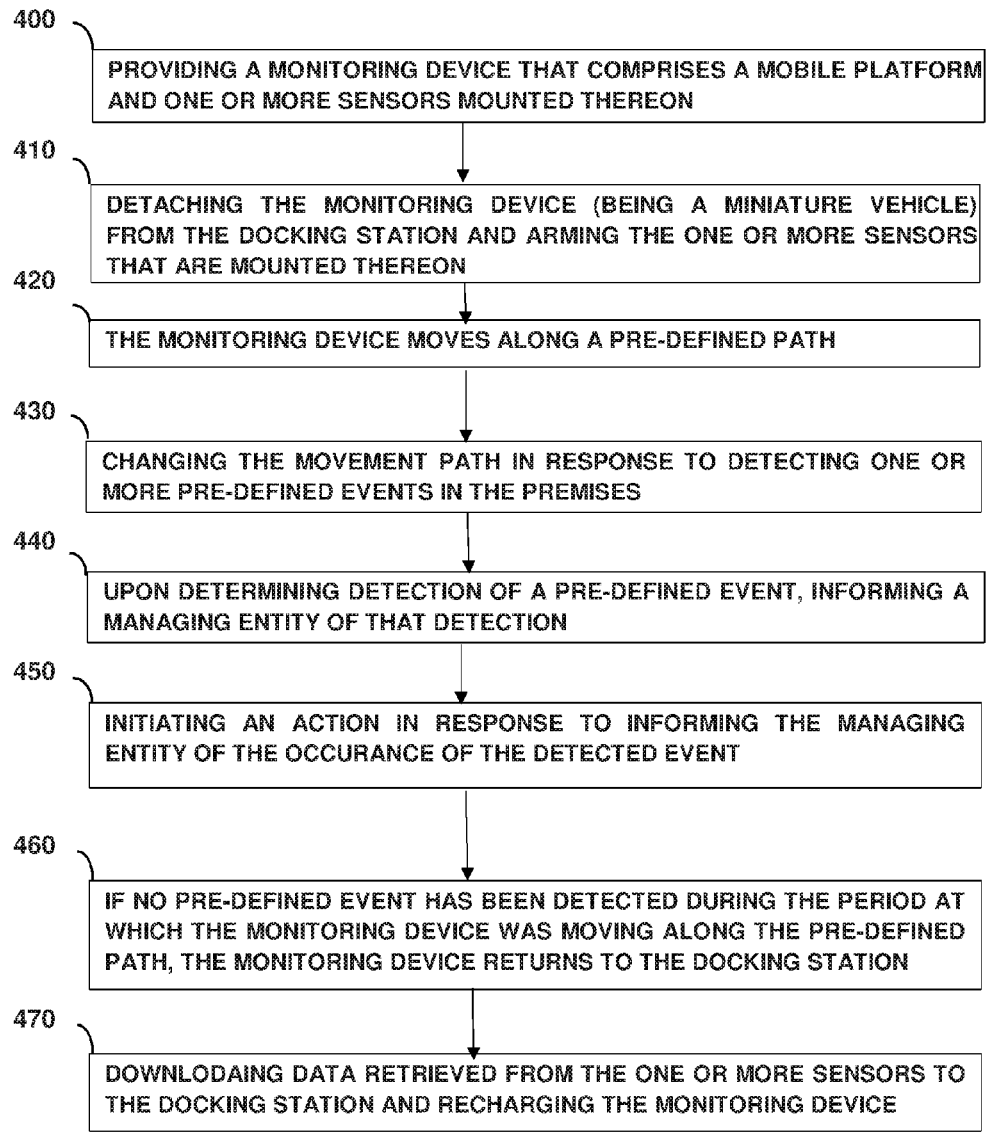
FIG. 4—is a flow chart diagram exemplifying a method carried out in accordance with an embodiment of the present invention.

FIG. 4 is a flow chart diagram being a non-limiting example of a method carried out in accordance with an embodiment of the present invention.

First, a monitoring device is provided (step 400) which comprises a mobile structure (e.g. an autonomous miniature vehicle) and a sensor (e.g. a motion sensor) mounted thereon, e.g. at an inclination that would allow the sensor moving at the floor level, to scan at least the lower half of the room being scanned by this sensor. The monitoring device is positioned in a docking station from which it leaves when necessary, to carry out s monitoring patrol.

Let us now assume that the monitoring device is configured to detach itself from the docking station from the docking station, at pre-defined time intervals from the time the system was armed, e.g. every 30 minutes. Then, when the appropriate time arrives, the autonomous miniature vehicle detaches itself from the docking station and the sensors are armed (step 410).

Next, the vehicle begins its patrol by taking a pre-defined path, moving from one room to another (step 420).

Suppose the processor installed at the monitoring device, which processes data retrieved by the motion sensor under real time (or near real time) conditions, determines that a motion or any other event in one of the rooms has been detected. It then instructs the controller of the drive motor to change the monitoring device pre-defined route (if necessary) to allow the motion sensor to further scan the place where the suspected motion was detection, preferably from different angle(s) (step 430), and/or to avoid contact with the burglar, if the latter moves towards the monitoring device in an attempt to damage it.

If the processor, after processing the additional data obtained from the motion sensor reaches the conclusion that indeed a pre-defined event (e.g. an unauthorized movement within the house) is taking place, it forwards its conclusion to a managing entity (step 440), which can be installed at the docking station, at another place of still within the user's premises or at a remote location. This conclusion may be forwarded either wirelessly (if the motion device is also equipped with a wireless transmission means) or by quickly returning to the docking place whether it attaches itself to the docking place and forwards the conclusion to the processor installed thereat.

Once a determination is made that an unauthorized movement was detected certain actions may be taken (step 450), such as those that are known in the art per se in case of prior art burglar systems (e.g. sounding an alarm, contacting a call center to send security personal over, etc.).

If no such pre-defined event has been detected, once a patrol is completed, the monitoring device returns to the docking station and attaches itself thereto (step 460). Data retrieved from the sensor is downloaded to the docking station and the monitoring device is being recharged (step 470).

One possible way according to the present invention to determine whether pre-defined event (e.g. an unauthorized movement) took place is by was using a scanning sensor incorporated in the monitoring device while the latter carries out the patrol within the user's premises (e.g. while driving around or while flying if the carrying platform is a drone), and the data acquired by the scanning processor is used by the appropriate processor to generate a 3D virtual model of the user's premises. The model is then compared against a previously generated 3D virtual model (either while calibrating the system and/or while carrying out the preceding patrol). If a change is detected between the two 3D virtual models, a determination may be made that a pre-defined event had occurred, e.g. which could be followed by sounding an alarm.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features.

Variations of embodiments described herein and embodiments of the present invention comprising different combinations of features noted in the described embodiments will occur to persons of the art. The scope of the invention is limited only by the following claims.

The invention claimed is:

1. A mobile monitoring device for monitoring a user's premises space, comprising:
   at least one drive motor configured to allow the mobile monitoring device to move from one room to another within the user's premises space;
   a processor configured to exchange wireless communications with a docking station located within the user's premises space and to carry out a monitoring patrol by following a pre-defined path; and
   at least one sensor configured to scan at least a portion of a room to enable a determination of occurrence of one or more pre-defined events, wherein the one or more pre-defined events include an unauthorized movement within a house; and
   upon determining an occurrence of the unauthorized movement in a room, the processor is configured to change the pre-defined path to allow scanning the room from at least one additional angle.

2. The mobile monitoring device of claim 1, wherein the mobile monitoring device is a drone configured to autonomously fly along a pre-defined path within the house and to change the pre-defined path in order to avoid collision with a new obstacle currently placed at the pre-defined path.

3. The mobile monitoring device of claim 1, wherein the mobile monitoring device is an autonomous miniature vehicle configured to drive along a pre-defined path within the house and to change the pre-defined path in order to avoid collision with a new obstacle currently placed at the pre-defined path.

4. The mobile monitoring device of claim 1, wherein the mobile monitoring device is configured to move in the house along a path determined based on real-time data retrieved from the at least one sensor.

5. The mobile monitoring device of claim 1, wherein the processor is further configured to, upon determining an occurrence of the unauthorized movement in a room, change a pre-defined path to allow scanning of the room from at least one additional angle.

6. The mobile monitoring device of claim 1, wherein the processor is further configured to processes data retrieved by the at least one sensor under real time conditions, and to detect a pre-defined event in one of the rooms of the house.

7. The mobile monitoring device of claim 1, wherein the processor is further configured to determine the unauthorized movement within the house based on comparison of data acquired by the at least one sensor and a 3D virtual model of the house.

8. The mobile monitoring device of claim 1, wherein the processor further configured to affect activities of other electronic devices located within the house.

9. The mobile monitoring device of claim 8, wherein the monitoring device is configured to function as a navigational tool for guiding an automatic vacuum cleaner.

10. The mobile monitoring device of claim 1, further comprising a power module configured to be wirelessly charged by the docking station.

11. The mobile monitoring device of claim 10, wherein the wireless communications transmitted to the docking station include raw data acquired by the at least one sensor.

12. The mobile monitoring device of claim 1, further comprising a receiver configured to utilize information retrieved from the docking station, in order to allow the mobile monitoring device to reach a location of the docking station within the user's premises space.

13. The mobile monitoring device of claim 1, wherein the at least one sensor is a member selected from a group that consists of: a motion sensor, a smoke detector, a temperature sensor, a depth sensor, an image sensor, a pyro-electric sensor, and any combination thereof.

14. The mobile monitoring device of claim 1 comprising a plurality of sensors, wherein each of at least two of the plurality of sensors is configured to enable determining occurrence of at least one pre-defined event different from the other.

15. The mobile monitoring device of claim 1 comprising a plurality of sensors, wherein the processor is further configured to determine an occurrence of a pre-defined event based on data retrieved from two or more sensors.

16. A method for monitoring a user's premises space using a mobile monitoring device, the method comprising:
   detaching the mobile monitoring device from a docking station located within the user's premises space;
   carrying out a monitoring patrol by following a pre-defined path, wherein the monitoring patrol includes moving within the user's premises space from one room to another;
   using at least one sensor for scanning at least a portion of a room to enable a determination of an occurrence of one or more pre-defined events, wherein the one or more pre-defined events include an unauthorized movement within a house; and
   upon determining an occurrence of the unauthorized movement in a room, changing the pre-defined path to allow scanning the room from at least one additional angle.

17. A non-transitory computer-readable storage medium storing instructions that, when executed by a processor, cause the processor to perform a method for monitoring a user's premises space using a mobile monitoring device, the method comprising:
   detaching the mobile monitoring device from a docking station located within the user's premises space;
   carrying out a monitoring patrol by taking a pre-defined path, wherein the monitoring patrol includes moving within the user's premises space from one room to another; and
   using at least one sensor for scanning at least a portion of a room to enable a determination of an occurrence of one or more pre-defined events, wherein the one or more pre-defined events include an unauthorized movement within a house; and upon determining an occurrence of the unauthorized movement in a room, changing the pre-defined path to allow scanning the room from at least one additional angle.

\* \* \* \* \*